United States Patent [19]

Hurlow

[11] Patent Number: 4,671,131

[45] Date of Patent: Jun. 9, 1987

[54] TRANSMITTER FOR USE WITH A TWO-CABLE SHIFTING MECHANISM FOR A TRANSMISSION

[75] Inventor: Robert H. Hurlow, Bainbridge Island, Wash.

[73] Assignee: Cablecraft, Inc., Tacoma, Wash.

[21] Appl. No.: 830,116

[22] Filed: Feb. 18, 1986

[51] Int. Cl.⁴ .............................................. G05G 9/16
[52] U.S. Cl. ............................. 74/471 X Y; 74/473 R
[58] Field of Search ........... 74/473 R, 501 R, 471 XY

[56] References Cited

U.S. PATENT DOCUMENTS

| | | |
|---|---|---|
| 2,280,047 | 4/1942 | Nampa . |
| 2,280,157 | 4/1942 | Mead . |
| 2,497,930 | 2/1950 | Creson . |
| 2,547,317 | 4/1951 | Gustafson . |
| 3,541,877 | 11/1970 | Houk . |
| 3,604,284 | 9/1971 | Houk . |
| 4,050,325 | 9/1977 | Shishido ............................ 74/473 R |
| 4,137,792 | 2/1979 | Ceccano ............................ 74/473 R |
| 4,143,560 | 3/1979 | Kinkade et al. . |
| 4,152,950 | 5/1979 | Langford . |
| 4,270,403 | 6/1981 | West . |
| 4,458,549 | 7/1984 | Tani et al. . |
| 4,459,870 | 7/1984 | Gill et al. ....................... 74/471 X Y |
| 4,483,211 | 11/1984 | Hurlow ............................ 74/473 R |
| 4,583,417 | 4/1986 | Hurlow ........................... 74/471 X Y |

FOREIGN PATENT DOCUMENTS

| | | | |
|---|---|---|---|
| 59-36829 | 2/1984 | Japan ................................ 74/473 R |
| 2068065A | 8/1981 | United Kingdom . |

*Primary Examiner*—Thomas F. Callaghan
*Attorney, Agent, or Firm*—Christensen, O'Connor, Johnson & Kindness

[57] ABSTRACT

In a remote shifter for a vehicle transmission, a transmitter unit is located near the vehicle operator while a receiver unit is mounted on the transmission. The transmitter and receiver are coupled by flexible push-pull cables that transfer the motion of the gear shift lever operated by the vehicle operator of the transmission to select and engage the desired gears in the transmission. The shift lever is operable in two independent modes of pivotal motion about orthogonal axes. Motion in the first mode controls gear fail selection in the transmission and motion in the second mode controls gear engagement. The transmitter couples the gear shift lever to the cables so that pivotal motion of the gear shift lever in a transverse plane is translated to linear motion of the select control cable while pivotal motion of the gear shift lever in the fore/aft plane is translated to linear motion of a second shift control cable. The transmitter maintains the motion of the two cables independent of one another. The gear shift lever is mounted to the vehicle by a mounting apparatus that maintains the shift lever orthogonal to the transverse axis at all times regardless of the motion of the shift lever in either the fore/aft or transverse planes. In a preferred embodiment of the invention, one of the cables is connected directly to the shift lever so that movement of the shift lever in the fore/aft axis translates into direct fore/aft motion of the cable.

2 Claims, 6 Drawing Figures

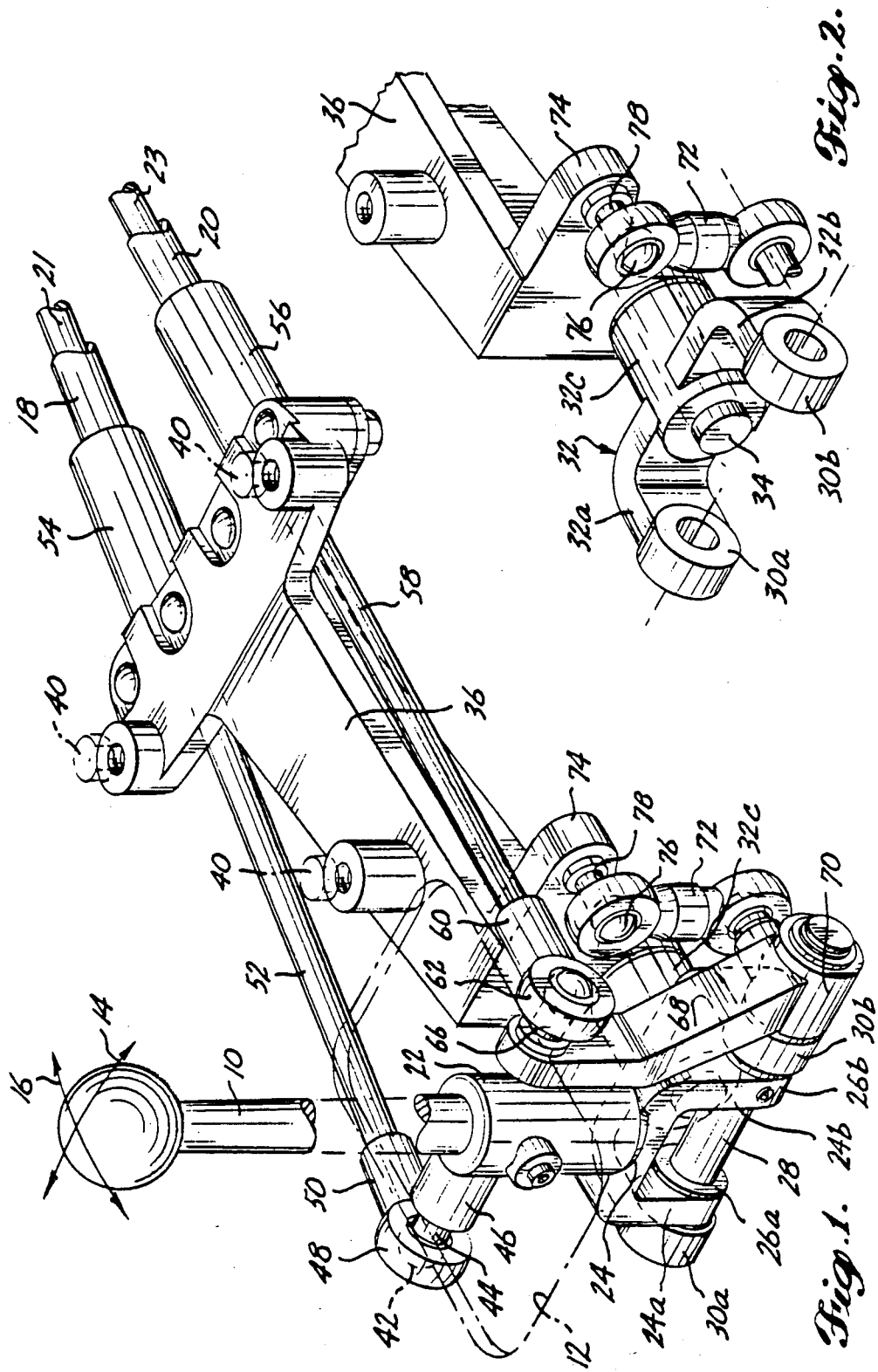

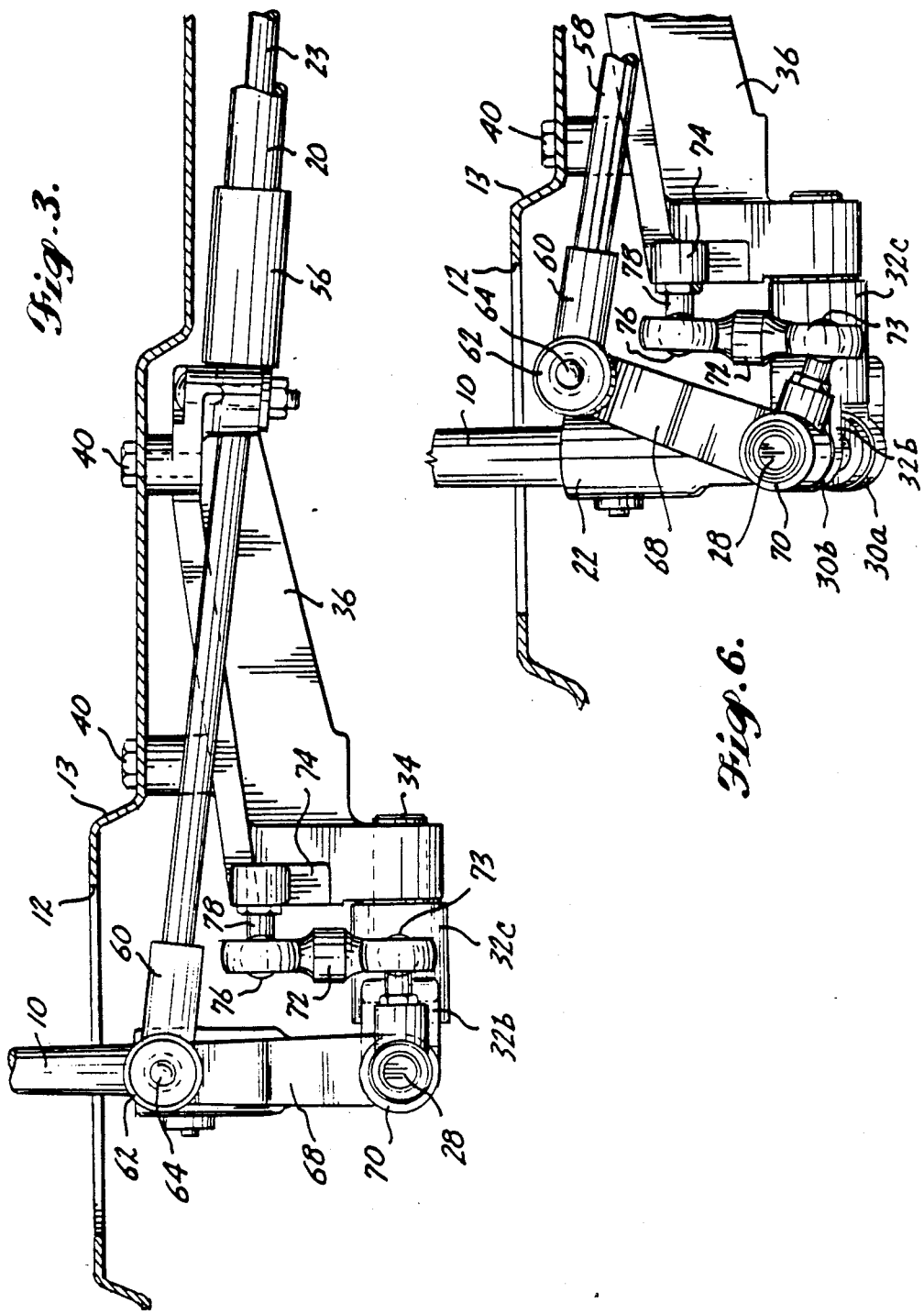

TRANSMITTER FOR USE WITH A TWO-CABLE SHIFTING MECHANISM FOR A TRANSMISSION

BACKGROUND OF THE INVENTION

This invention relates to improvements in remotely controlled actuator mechanisms requiring two independent modes of motion and, more particularly, relates to an improved push-pull cable system for shifting gears in a vehicle transmission by operation of a gear shift lever remotely located from the transmission.

In the present state of the art, situations in which a vehicle transmission is remotely located from the vehicle operator, such as in a cabover design truck or in a bus with a rear engine, systems of torque tubes and rigid links are used to transmit control motion of the gear shift lever by the operator to the vehicle transmission. In order to simplify installation of the transmission control mechanism, it is possible to utilize flexible coaxial push-pull cables to operate the transmission mechanism by remote control.

When using flexible push-pull cables for such remote actuation of the transmission, cable friction and backlash are important factors to be considered. Also, it is necessary to fit the linking system into a relatively small and predetermined space envelope. Typically, two independent mode of motion are used in controlling the transmission, motion in one mode being used to select the gear rail on which the deired gears are located in the transmission, and the second mode of motion being utilized to actually shift the transmission to the desired gears. In order to obtain proper operation of the transmission, it is necessary to keep the motion in the two modes independent of each other and any linkage that is used to transfer motion from the operator of the transmission must minimize interaction between motion in the two modes.

SUMMARY OF THE INVENTION

In accordance with the present invention, a transmitter unit is located in close proximity to the vehicle operator, and is under the operator's control through means of a transmitter unit control member, for example the gear shift lever. The lever is guided for motion in a first mode such as fore and aft so as to produce longitudinal displacement of a first push-pull cable that will be designated as the shift cable. The shift cable is coupled to a receiver unit, which is located adjacent the transmission to affect shifting of the transmission.

The gear shift lever is also movable in a side-to-side motion by the operator pivoting the lever about the fore and aft axis of the cab. The side-to-side motion is transformed by a linkage mechanism to a longitudinal displacement of a second push-pull cable that will be designated as the select cable which, again, is coupled to a linkage in the receiver unit to effectuate selection of the desired gear rail in the transmission. The connection of the gear shift lever with the shift cable is so related to the linkage connecting the gear shift lever to the select cable that there is substantially no interaction between the longitudinal movement of the two push-pull cables as the gear shift lever is moved in each of the two modes of motion.

The transmitter described can be used with any receiver capable of accepting longitudinal movement of two independent cables to effect operation of a transmission. For example, the receiver unit described in U.S. Pat. No. 4,483,211 issued Nov. 20, 1984, or the receiver described in my copending patent aplication Ser. No. 623,977, filed June 26, 1984. The latter-described receiver is useful for connection of the transmitter to a transmission of the type manufactured by Zahnradfabrik Friedrichshafen of Friedrichshafen, West Germany. Such receiver provides a selection linkage connected to the select cable that transforms the longitudinal motion of the select cable into a longitudinal linear motion of an output rod connected to the transmission to select the desired gear rail. The shift cable from the transmitter is connected to a second linkage in the receiver that transforms the longitudinal motion of the shift cable to a rotational motion of the rod to effectuate actual engagement of the desired gears in the selected gear rail.

BRIEF DESCRIPTION OF THE DRAWINGS

The above-described features and advantages of the invention, as well as the operation of the invention will become more clear to those of ordinary skill in the art and other upon reading the ensuing specification when taken in conjunction with the appended drawings wherein:

FIG. 1 is an isometric view of a preferred embodiment of a transmitter assembly made in accordance with the principles of the present invention.

FIG. 2 is an isometric view of a portion of the transmitter assembly of FIG. 1.

FIG. 3 is a side elevational view of the transmitter assembly of FIG. 1 showing the gear shift lever in a neutral position.

FIG. 6 is a side elevational view of the transmitter of FIG. 5 with the same sideways tilt of the gear shift lever.

DETAILED DESCRIPTION OF THE PREFERRED EMBODIMENT

Figure 4:
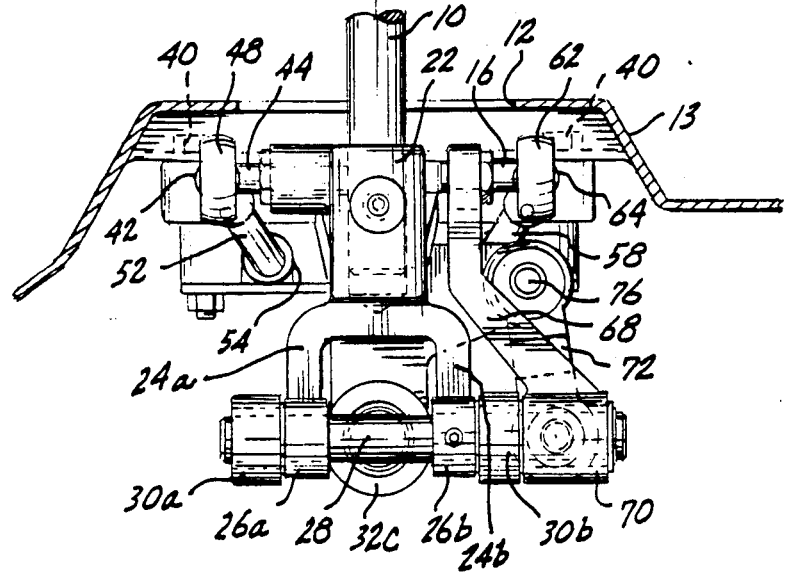
FIG. 4 is a front elevational view of the transmitter assembly of FIG. 1 showing the gear shift in a neutral position.

FIG. 1 illustrates a preferred embodiment of a transmitter assembly made in accordance with the principles of the present invention for allowing an operator located remotely from a mechanical transmission to shift the gears in the transmission. The transmitter assembly is typically housed within a casing and is mounted beneath the floor of a truck cab adjacent the operator. A shift lever 10, a portion of which is illustrated in FIG. 1, extends upwardly through an opening 12 in the floor 13 of the cab, as shown in phantom line of FIG. 1, to be grasped by the operator. The gear shift lever 10 is typically operable in two modes of motion. Movement in a first mode of motion effectuates the selection of one of the gear rails in a remote transmission unit (not shown) and operation in the second mode causes selective engagement of one of the drive gears in the same transmission unit associated with the gear rail that has been selected. In the embodiment shown in FIG. 1, it will be assumed that the gear rail selection is accomplished by movement of the shift lever 10, side-to-side as shown by arrows 14, while engagement of the gear selected is accomplished by movement of the gear shift lever 10 in a fore/aft direction as shown by arrow 16. As will be described later, movement of the gear shift lever 10 is transformed into associated longitudinal movement of first and second push-pull cables 18 and 20 that are connected to linkages in a receiver unit (not shown) mounted adjacent the transmission unit. The receiver accepts the longitudinal movement of the respective push-pull cables and transforms the motion into the proper motion required to accomplish gear selection engagement in the transmission. The cables 18 and 20 are conventional coaxial control cables, each having an inner core 21 and 23 respectively, that moves with respect to the outer covering of the cable to transmit control motions of a control lever like the gear shift lever 10.

The gear shift lever 10 fits within a bore of collar 22 and is shown in FIG. 1 in essentially the neutral position. The lever 10 is pinned to the collar 22 so that the lever 10 cannot rotate within the collar. The collar 22 is integrally formed with a yoke 24 that includes first and second arms 24a and 24b, each of the arms having associated collars 26a and 26b, respectively, formed at their ends. Coaxial bores are formed with the collars 26a and 26b, the axes of the bores being oriented transversely with respect to the fore/aft direction as viewed in FIG. 1. The yoke 24 is connected to a rod 28 that passes through the bores in each of the collars 26a and 26b. The collars are pinned to the rod 28 so that movement of the gear shift lever 10 in the fore/aft direction will rotate the transversely oriented rod 28.

the rod 28 extends beyond the collars 26a and 26b and engages bores formed in collars 30a and 30b that form an integral part of the arms 32a and 32b of a second yoke assembly 32. The arms 32a and 32b are integrally formed with a central yoke collar 32c which is rotatably mounted on a pin 34 affixed to a foreward portion of a mounting assembly 36 that is bolted to the floor 13 of the cab by the bolts 40. The yoke 32 and its relationship to the mounting assembly 36 can best be seen in FIG. 2. The rod 28 is free to move within the collars 30a and 30b so that movement of the shift lever 10 in the fore/aft direction while it carries with it the rod 28 will not affect the collars 30a or 30b or the yoke 32.

Referring again to FIG. 1, a ball 42 affixed to a mounting stud 44 that is threadably engaged with a socket 46 that extend laterally from the collar 22. The ball 42 is captured within a complementary socket 48 formed on an end fitting 50 affixed to a first end of a first slide rod 52 that extends fore/aft from a position adjacent the shift lever 10 to a coupling 54 that couples the slide rod to the first push-pull cable 18 in a conventional manner. As is readily evident from the figures, movement of the shift lever 10 in the fore/aft direction, as shown by arrow 16, necessarily causes complementary fore/aft movement of the ball 42 and socket 48 which in turn causes fore/aft motion of the slide rod 52, and complementary fore/aft motion of the inner core 21 of the push-pull cable 18. The fore/aft movement of the inner core 21 of the cable 18, as was mentioned earlier, is utilized at a rceiver unit to accomplish either shifting or selection of the gears of a transmission. As will be described below, the transmitter is constructed and arranged so that the fore/aft movement of the inner core 21 of the shift cable 18 caused by fore/aft movement of the shift lever 10 has no affect on the second push-pull cable 20.

The inner core 23 of the second push-pull cable 20 is attached by means of a conventional coupler mechanism 56 to a second slide rod 58, the foreward end of which is connected to a fitting 60 that includes a socket portion 62. The socket 62 holds captured within it a ball 64 formed on the end of a stud 66 which in turn is threadably engaged with a first end of a control arm 68 rotatably mounted on the transverse rod 28 by means of a collar 70 formed in a second end of the control arm 68. The rod 28 engages a bore formed through the collar 70. The rod 28 is freely rotatable within the collar 70 so that movement of the rod 28 in response to the fore/aft motion of the shift lever 10 has no effect on the control arm 68. As the gear shift lever 10 is moved side-to-side, however, the second yoke 32 which is rotatably mounted on pin 34 extending from the mounting assembly 36 pivots about the pin 34 and, consequently, about the fore/aft axis of the vehicle. A control link 72 has a socket formed on a first end thereof that engages a ball 73 affixed to the collar 70 of the control arm 68. The socket is universally pivotable on the ball 73. A second end of the control link 72 is pivotally attached to a flange 74 that extends laterally from the foreward end of the mounting assembly 36. The coupling of the second end of the control link to the flange 74 is accomplished by a ball and socket coupling, the socket portion of which is comprised of a socket formed on the second end of the control link 72 and the ball portion of which is a ball 76 which is an integral part of a stud 78 threadably engaged within the flange 74 of the mounting assembly.

Figure 5:
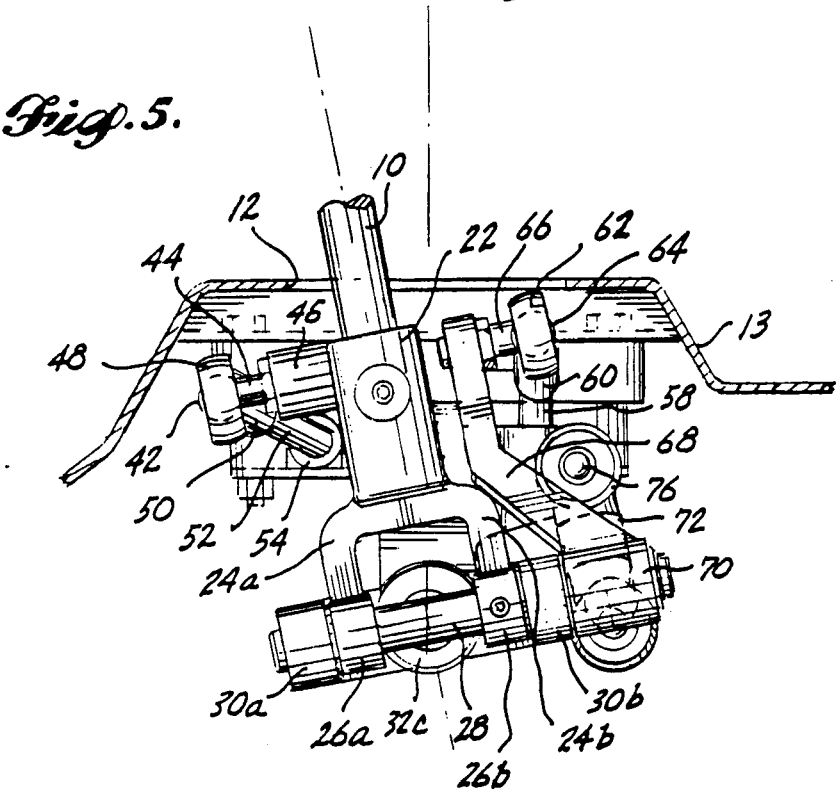
FIG. 5 is a front elevational view of the transmitter assembly shown in FIG. 1 showing a sideways displacement of the gear shift lever.

As the shift lever 10 is moved sideways, for example as pictured in FIG. 5, the collar 70 moves upwardly along with the end of the rod 28. As the collar 70 moves upwardly, it tends to apply compressive force to the control link 72. However, since the control link 72 is a rigid member and is incompressible, the reaction of the control link, rather than compression, is a tendency to pivot about the balls 73 and 76. The upper end of the control link is not linearly moveable with respect to vehicle structure because of its attachment to the mounting assembly 36. Therefore, the control link 72 must pivot to react to the upward pressure caused by the sideways movement of the gearshift lever 10. As can best be seen in FIG. 6, the reaction forces of the link 72 cause a pivotal motion in the control arm 68 that moves the upper end of the control arm 68 rearwardly, that is, to the right as viewed in FIG. 6, causing complementary motion of the second slide rod 58 rearwardly which, in turn, causes rearward motion of the inner core 23 of the second push-pull cable 20.

Although not illustrated, it should be clear to those of ordinary skill in the art that movement of the gear shift lever 10 in the opposite sideways direction, for example to the right as viewed in FIG. 5, would have the opposited effect on the control link 72 and control arm 68 so that there would be movement of the control arm upper end to the left as viewed in FIG. 6 or foreward with relation to the cab thereby moving the inner core 23 of the second push-pull cable 20 forewardly in response. It can be seen therefore that the linkage of the gear shift lever 10 through the control arm 68 and control link 72 translates the side-to-side motion of the gear shift lever 10 into a fore/aft motion of second slide rod 58 and, hence, fore/aft motion of the inner core of the second push-pull cable 20 to transmit a longitudinal motion to a receiver unit located adjacent the vehicle transmission. Again, as will be apparent from the illustrations, particularly FIG. 5, the sideways motion of the gear shift lever 10 moves the ball 42 and socket 46 connecting the first push-pull cable 18 to the gear shift lever somewhat. However, it does not cause any significant longitudinal motion of the ball and socket joint or the first slide rod 52. Therefore, the side-to-side motion of the gear shift lever 10 effects only the longitudinal movement of the second-pull cable 20 and, as was earlier discussed, the fore and aft motion of the gear shift lever 10 has an effect on only the longitudinal movement of the first push-pull cable 18 such that there is no significant interaction between the longitudinal movement of the cables 18 and 20 with respect to the movement of the gear shift lever.

The essential function of the transmitter is to cause the motion of the gear shift lever by the operator to be translated into independent linear motions of two cables exiting the transmitter. In an actual application of the transmitter to a vehicle, the transmitter would be combined with a receiver positioned adjacent the vehicle transmission. The function of the receiver is to take the input from the transmitter that consists of linear motion of two independent push-pull cables, one of which indicates gear selection and one that indicates shifting, and couple those inputs to the transmission in a manner to actually cause the shift of gears within the transmission. Therefore, one of ordinary skill in the art can see that any receiver which accepts the linear motion of two independent shift and select cables can be operated through use of the transmitter described and illustrated herein. The transmitter of the present invention could be used with the receiver, for example, of the type described in U.S. Pat. No. 4,483,211 issued Nov. 20, 1984, or that described in my copending U.S. patent application Ser. No. 623,977. In fact, the transmitter of the present inventon can be used in any environment in which it is desired to send independent longitudinal motion signals from a control mechanism to a remote piece of equipment. While a preferred embodiment of the invention has been described and illustrated herein, it is understood by those of oridnary skill in the art and others that change can be made to the invention without departing from the spirit and scope of the present invention. The invention should, therefore, be defined solely with reference to the appended claims.

The embodiments of the invention in which an exclusive property or privelege are claimed is defined as follows:

1. In a dual-linkage remote shifter apparatus including a transmitter unit easily accessible by an operator of a vehicle and a receiver unit located remotely from the transmitter unit adjacent the vehicle transmission, an improved transmitter unit comprising:

an elongated control member;

first means for mounting said control member to said vehicle for movement of said control member about a first axis, and indpendent movement of said control member about a second axis orthogonal to said first axis, said mounting means being constructed and arranged such that as said control member moves about said first axis, said second axis also moves about said first axis to maintain said second axis orthogonal to said control member, said first mounting means including a pin affixed to said vehicle coaxially with said first axis, a first yoke having a central portion and having first and second arms extending from said central portion, the central portion of said yoke rotatably mounted on said pin, a second pin rotatably mounted within the arms of said first yoke coaxially with said second axis, and a second yoke having a central portion and having first and second arms extending from said central portion, said first and second arms of said second yoke being mounted on said second pin, said elongate control member being fixed to said central portion of said second yoke;

a first output link pivotally coupled at a first end thereof to said control member, said coupling of said first output link to said control member being constructed and arranged such that motion of said control member about said second axis results in linear movement of said first output link in a direction parallel to said first axis;

a second output link independent of said first output link coupled at a first end thereof to said transmitter unit and linkage means connecting said first end of said second output link to said control member, said linkage means being constructed and arranged such that motion of said control member about first axis results in linear motion of said second output link in a direction parallel to said first axis, said linkage means including a first control arm rotatably mounted at a first end thereof on said second pin and having a second end thereof pivotally attached to a first end of said second output link, a control link having a first socket formed on a first end thereof and a second socket formed on a second end thereof, said first socket cooperating with a ball member affixed to a first end of said control arm to form a ball and socket coupling and said second socket cooperating with a ball member affixed to said vehicle to form a second ball and socket coupling, said control link being constructed and arranged such that movement of said elongate control member about said first axis results in pivotal motion of said control link about said first and second ball members to cause rotation of said control arm about said second pin; and a socket affixed to a first end of said first output link, and a ball member affixed to said elongate control rod, said socket and said ball member cooperating to form a ball and socket joint for the pivotal attachment of said first end of said first output link to said elongate control member.—

2. The transmitter unit of claim 1 wherein said first and second output links are the respective movable members of flexible coaxial push-pull cables.

* * * * *

UNITED STATES PATENT AND TRADEMARK OFFICE
CERTIFICATE OF CORRECTION

PATENT NO.  : 4,671,131

DATED       : June 9, 1987

INVENTOR(S) : Robert H. Hurlow

It is certified that error appears in the above-identified patent and that said Letters Patent is hereby corrected as shown below:

| | |
|---|---|
| Abstract, line 10: | "fail" should be --rail-- |
| Column 1, line 27: | "mode" should be --modes-- |
| Column 2, line 1: | "aplication" should be --application-- |
| Column 2, line 21: | "other" should be --others-- |
| Column 3, line 29: | "the" should be --The-- |
| Column 3, line 34: | "foreward" should be --forward-- |
| Column 3, line 44: | "extend" should be --extends-- |
| Column 3, line 58: | "rceiver" should be --receiver-- |
| Column 3, line 67: | "foreward" should be --forward-- |
| Column 4, line 19: | "foreward" should be --forward-- |
| Column 4, lines 51, 52 | "opposited" should be --opposite-- |
| Column 4, line 54: | "foreward" should be --forward-- |
| Column 4, line 56: | "forewardly" should be --forwardly-- |
| Column 5, line 4: | "second-pull" should be --second push-pull-- |
| Column 5, line 32: | "inventon" should be --invention-- |
| Column 5, line 37: | "oridnary" should be --ordinary-- |
| Column 5, line 38: | "change" should be --changes-- |
| Column 5, line 43: | "privelege" should be --privilege-- |
| Column 5, line 50: | "elongated" should be --elongate-- |
| Column 5, line 53: | "indpendent" should be --independent-- |
| Column 6, line 28: | insert --said-- before "first" |
| Column 6, line 53: | delete the dash ("--") after "member." |

Signed and Sealed this

Twentieth Day of September, 1988

Attest:

DONALD J. QUIGG

Attesting Officer

Commissioner of Patents and Trademarks